(12) United States Patent
Hintz et al.

(10) Patent No.: US 11,017,442 B2
(45) Date of Patent: May 25, 2021

(54) INTEGRATION OF A VIDEO PLAYER PUSHDOWN ADVERTISING UNIT AND DIGITAL MEDIA CONTENT

(71) Applicant: VIACOM INTERNATIONAL INC., New York, NY (US)

(72) Inventors: Jaime Hintz, New York, NY (US); Mark Fortner, New York, NY (US); Adam Solomon, East Setauket, NY (US); Colin McNamara, Brooklyn, NY (US); Mark Theophilis, Jersey City, NJ (US)

(73) Assignee: VIACOM INTERNATIONAL INC., New York, NY (US)

( * ) Notice: Subject to any disclaimer, the term of this patent is extended or adjusted under 35 U.S.C. 154(b) by 0 days.

(21) Appl. No.: 16/833,652

(22) Filed: Mar. 29, 2020

(65) Prior Publication Data
US 2020/0226644 A1    Jul. 16, 2020

Related U.S. Application Data

(63) Continuation of application No. 15/415,096, filed on Jan. 25, 2017, now Pat. No. 10,650,418, which is a continuation of application No. 12/970,575, filed on Dec. 16, 2010, now abandoned.

(51) Int. Cl.
*G06Q 30/00* (2012.01)
*G06Q 30/02* (2012.01)
*G06T 13/80* (2011.01)
*H04N 21/81* (2011.01)

(52) U.S. Cl.
CPC ..... *G06Q 30/0277* (2013.01); *G06Q 30/0257* (2013.01); *G06T 13/80* (2013.01); *H04N 21/812* (2013.01)

(58) Field of Classification Search
None
See application file for complete search history.

*Primary Examiner* — Alvin L Brown
(74) *Attorney, Agent, or Firm* — Fay Kaplun & Marcin, LLP (57) ABSTRACT

Described are systems and methods for dynamic integration and presentation of advertising content and media content. The method includes receiving a request for media content from a remote computing device and providing, in response to the request, an interactive advertising unit. The interactive advertising unit includes a first content layer including the requested media content and a media player, a second content layer including the advertising content, wherein the advertising content comprises static content and interactive content, an integration module configured to display the requested media content in the media player, and reveal the advertising content in an area extending from a boundary of a playback window of the media player, wherein revealing the advertising content includes moving web page content to accommodate the advertising content. The method includes transmitting the interactive advertising unit for presentation on the remote computing device.

20 Claims, 6 Drawing Sheets

INTEGRATION OF A VIDEO PLAYER PUSHDOWN ADVERTISING UNIT AND DIGITAL MEDIA CONTENT

PRIORITY claim

The present application is a Continuation Application of U.S. patent application Ser. No. 15/415,096 filed on Jan. 25, 2017, now U.S. Pat. No. 10,650,418; which is a Continuation Application of U.S. patent application Ser. No. 12/970,575 filed on Dec. 16, 2010. The disclosure of the above patent(s)/application(s) is incorporated herein by reference.

TECHNICAL FIELD

The subject matter of this application relates generally to methods and apparatuses, including computer program products, for integration of a video player pushdown advertising unit and digital media content.

BACKGROUND

Content providers have long sought to include advertising as part of their broadcasts in order to generate revenue and recoup the costs of content production, and manufacturers of consumer goods have placed their ads with various content providers in order to extol the virtues of their goods to the largest possible consumer audience. For example, ever since their earliest days, radio and television stations frequently have broadcast blocks of ads in between their programming segments. More recently, content providers on the Internet have utilized banner advertisements, pop-up advertisements, and other forms of interactive advertising on websites.

In order to capitalize on the recent explosion in availability of online media (e.g., streaming video feeds), content providers, consumer goods companies, and advertising films have turned their attention to developing dynamic and interactive experiences for users who access the online media.

SUMMARY OF THE INVENTION

It would be desirable to have a method and system for dynamically integrating advertising content with media content (e.g., digital media content) to achieve the effect of linking the advertisement with the context of the digital media content, web page, and/or the embedded media player, thereby increasing the advertisement's exposure to the consumer. Also, it would be desirable in some examples to completely interrupt the desired media content in a linear fashion by displaying the advertising content first, but also providing the user with a mechanism to interact with the advertising content and view the media content. It would be desirable in some examples to present the advertising content and the digital media content in a non-linear fashion so to leave the digital media content uninterrupted and substantially unobstructed while at the same time displaying the advertising content to the user, allowing the user to enjoy the desired media content while simultaneously viewing the advertising content. Also, it would be desirable in some examples to allow the user to interact with the advertising content and/or tie the media content and the advertising content together in a unique and unanticipated way.

In general overview, the techniques described herein are related to integration of a fully interactive rich media advertising unit and media content (e.g., digital media content) presented in a media player. The techniques provide for simulated integration, creating an illusion to a user that the advertising content and digital media content are brought together in the media player. The techniques also provide for functional integration via interaction between the advertising unit and the media player, including manipulation of spatial, temporal, and control components, resulting in a unique presentation of the advertising content and digital media content to the user. Spatial integration refers to the synchronization of position and coverage between the advertising unit and the media player. Temporal integration refers to the coordination of content display timing between the advertising unit and the media player. Control integration refers to the communication between the advertising unit and the media player in transferring influence and priority of displayed content. The techniques advantageously enable dynamic and unexpected interplay between digital media content contained in an embedded media player and an interactive, persistent advertising unit configured to capture the attention of a user and offer an engaging, memorable experience.

The invention, in one aspect, features a method for dynamic integration and presentation of advertising content and media content. The method includes receiving, by a server computing device, a request for media content from a remote computing device and providing, by the server computing device in response to the request, an interactive advertising unit. The interactive advertising unit includes a first content layer including the requested media content and a media player, a second content layer including the advertising content, wherein the advertising content comprises static content and interactive content, and an integration module configured to display the requested media content in the media player and reveal the advertising content in an area extending from a boundary of a playback window of the media player, wherein revealing the advertising content includes moving web page content to accommodate the advertising content. The method also includes transmitting, by the server computing device, the interactive advertising unit for presentation on the remote computing device.

The invention, in another aspect, features a system for dynamic integration and presentation of advertising content and media content. The system includes a server computing device configured to receive a request for media content from a remote computing device and provide, in response to the request, an interactive advertising unit. The interactive advertising unit includes a first content layer including the requested media content and a media player, a second content layer including the advertising content, wherein the advertising content comprises static content and interactive content, and an integration module configured to display the requested media content in the media player and reveal the advertising content in an area extending from a boundary of a playback window of the media player, wherein revealing the advertising content includes moving web page content to accommodate the advertising content. The server computing device is further configured to transmit the interactive advertising unit for presentation on the remote computing device.

The invention, in another aspect, features a computer program product, tangibly embodied in a computer readable storage medium, for dynamic integration and presentation of advertising content and media content. The computer program product includes instructions operable to configure a data processing apparatus to receive a request for media content from a remote computing device and provide, in response to the request, an interactive advertising unit. The interactive advertising unit includes a first content layer including the requested media content and a media player, a second content layer including the advertising content, wherein the advertising content comprises static content and interactive content, and an integration module configured to display the requested media content in the media player and reveal the advertising content in an area extending from a boundary of a playback window of the media player, wherein revealing the advertising content includes moving web page content to accommodate the advertising content. The computer program product further includes instructions operable to configure a data processing apparatus to transmit the interactive advertising unit for presentation on the remote computing device.

In some embodiments, any of the above aspects can include one or more of the following features. In some embodiments, the integration module is further configured to receive a request for additional media content associated with the revealed advertising content and display the additional media content within the boundaries of the playback window of the media player.

In some embodiments, revealing the advertising content occurs without user input, after a predetermined period of time, or both. In some embodiments, revealing the advertising content occurs in response to a user request. In some embodiments, revealing the advertising content is synchronized with playback of the requested media content.

In some embodiments, the integration module is further configured to conceal the revealed advertising content. In some embodiments, concealing the revealed advertising content occurs in response to a user request. In some embodiments, concealing the revealed advertising content occurs without user input, after a predetermined period of time, or both.

In some embodiments, the integration module is further configured to manage the spatial presentation of the requested media content and the advertising content, synchronize the temporal presentation of the requested media content and the advertising content, and control the presentation priority of the requested media content and the advertising content. In some embodiments, managing the spatial presentation includes positioning the advertising content over the media player so as to obscure the requested media content. In some embodiments, managing the spatial presentation includes positioning the advertising content in proximity to the media player so as to display the requested media content unobscured.

In some embodiments, the integration module displays an animation in revealing the advertising content. In some embodiments, the integration module extends the display area of the requested media content to a widescreen format. In some embodiments, the integration module displays an animation in concealing the revealed advertising content.

In some embodiments, the static content and the interactive content are related according to genre, theme, advertised product, subject matter, or any combination thereof. In some embodiments, the interactive content includes arcade games, puzzle games, trivia games, content rating applications, interactive virtual objects representative of the functionality of the advertised product, chat windows, product catalogs, or other types of interactive entertainment or communication applications.

In some embodiments, the integration module is further configured to receive input based on a user action. In some embodiments, at least one of the static content and the interactive content includes a graphical representation of an advertised product, an advertised service, or both. In some embodiments, the integration module is configured to transmit one or more commands from the second content layer to the first content layer, the one or more commands operable to control playback of the requested media content in the media player.

DETAILED DESCRIPTION

In general overview, the techniques described herein are directed to methods and apparatuses, including computer program products, for dynamic integration and presentation of advertising content and media content (e.g., digital media content). As described in more detail, the advertising content is combined with the digital media content (displayed in, for example, a media player) in a seamless fashion to provide an interactive advertising unit. The creation of the interactive advertising unit provides the advantages of greatly increasing a user's exposure to the advertising content while not materially diminishing the user's consumption of the digital media content. The nature of the interactive advertising unit, displaying advertising content in proximity to requested digital media content, allows the use of a broad range of marketing techniques, such as product placement, brand association, and click-through opportunities. Thus, the techniques provide an opportunity for manufacturers to increase the effectiveness of their advertising while maintaining the accessibility and appeal of the requested digital media content.

The display of the advertising and digital media content is not limited to a web browser or traditional embedded media player. For example, the advertising content and/or video content could be displayed to a user via an interactive application downloaded and executed on a smart phone, i.e., an "app" configured to run on the iPhone® from Apple® Computer, Inc.

Figure 1:
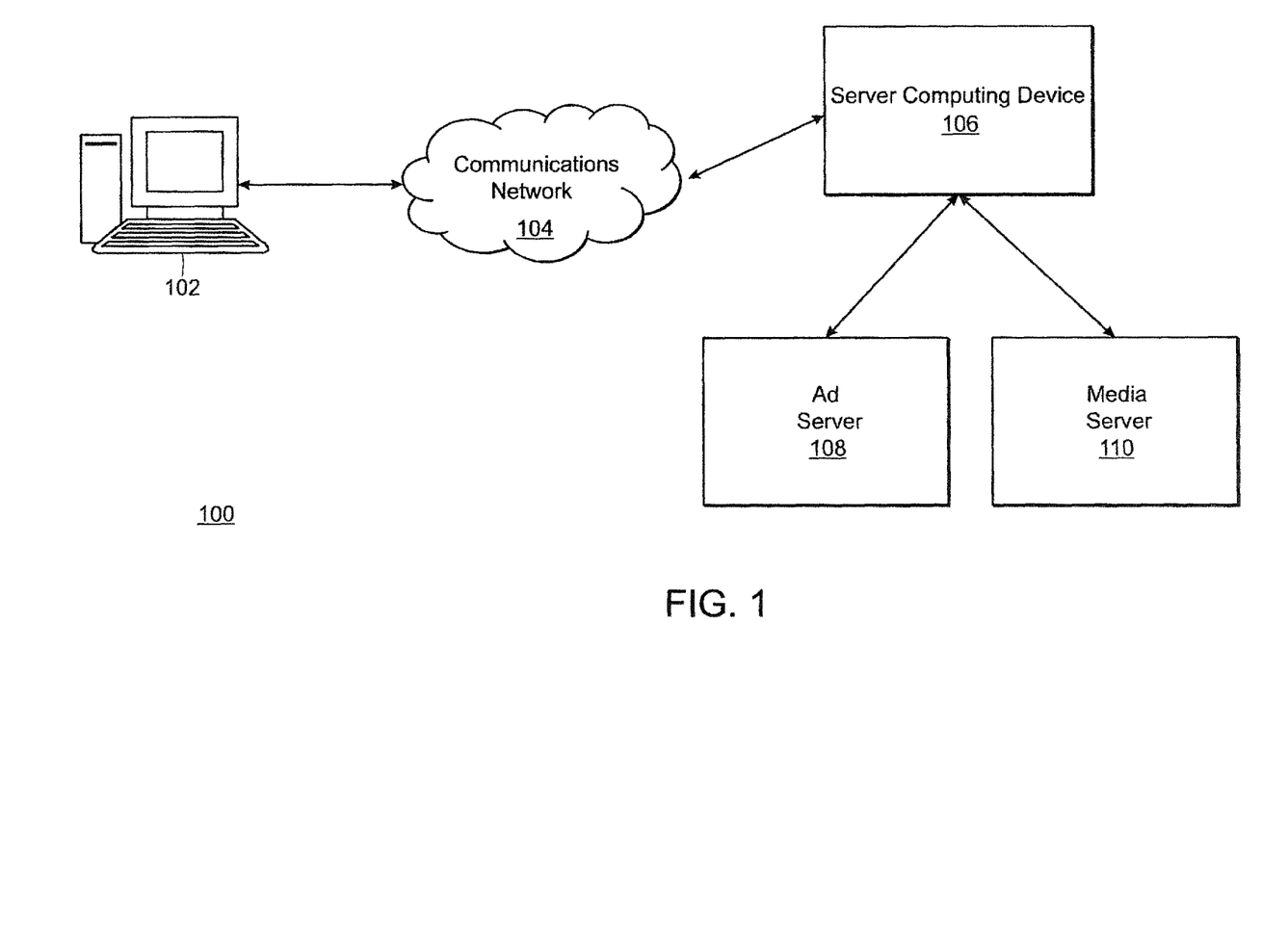
FIG. 1 is a block diagram of a system for the dynamic integration and presentation of advertising and media content.

FIG. 1 is a block diagram of a system 100 for dynamic integration and presentation of advertising and media content. The system 100 includes a client computing device 102, a communications network 104, and a server computing device 106. In some embodiments, the server computing device 106 is connected to one or more other computing devices which provide advertising content (e.g., ad server 108) and digital media content (e.g., video server 110). The server computing device 106, ad server 108, and video server 110 can reside at the same physical location or may be dispersed to multiple physical locations. The server computing device 106, ad server 108, and video server 110 can be located on the same physical device or one or more of the servers 106, 108, 110 can be distributed over many devices. The server computing device 106, ad server 108, and video server 110 can communicate via a communications network, for example communications network 104.

The client computing device 102 is the hardware that displays the interactive advertising unit containing advertising content and digital media content to a user. Example computing devices take on many forms, including but not limited to a personal computer, a standalone video player, a home video game console, a portable video game system, a personal digital assistant (PDA), an internet appliance, a smart phone, a set-top box, or the like. The computing device 102 includes network-interface components to enable the user to connect to a communications network 104, such as the Internet. The computing device 102 also includes browser software to enable the user to interact with web sites and other content providers. Some example browser software includes Microsoft® Internet Explorer, Mozilla Firefox®, or other similar software applications. The client computing device 102 also includes digital content playback plug-ins or standalone software to enable the user to view digital media content (e.g., video and audio) received over the communications network 104. Examples of digital media content playback software includes Microsoft® Windows Media® Player, Adobe® Flash® Player, QuickTime® from Apple® Computer, Inc., or other similar applications.

The server computing device 106 hosts web pages and other similar content, and receives content requests from the client computing device 102 via the communications network 104.

The communications network 104 channels communications from the client computing device 102 to the server computing device 106. The network 104 may be a local network, such as a LAN, or a wide area network, such as the Internet or the World Wide Web.

The ad server 108 hosts advertising content for use by the server computing device 106. In some embodiments, the ad server 108 receives requests for advertising content directly from the client computing device 102 via the communications network 104. In some embodiments, the ad server 108 receives requests for advertising content from the client computing device 102 by way of the server computing device 106. Advertising content can take a variety of forms. Examples include a static banner ad, a graphical animation or an interactive, rich media application that contains graphics, animation, audio, and/or video content, such as a Flash® application.

The media server 110 hosts digital media content for use by the server computing device 106. In some embodiments, the media server 110 can receive requests for digital media content from the client computing device 102 via the communications network 104. In some embodiments, the media server 110 receives requests for advertising content from the client computing device 102 by way of the server computing device 106. The digital media content can take a variety of forms. The media content can be short-form video content, i.e., a four-minute music video. The media content can be long-form video content, i.e., a thirty-minute television program. The media content can be audio content, i.e., a radio broadcast. Other examples include user-submitted amateur video, professional television shows, motion pictures, webcasts, podcasts, music videos, or other similar content.

Figure 2:
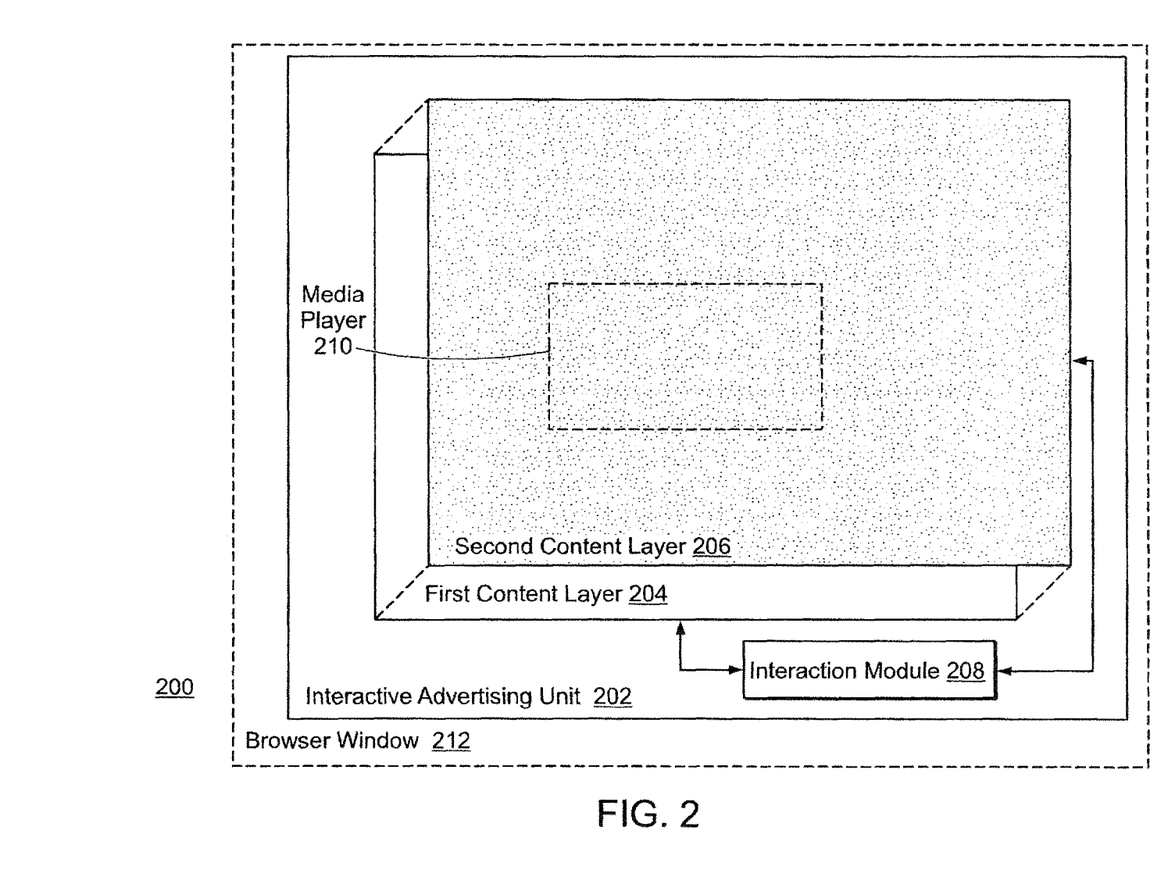
FIG. 2 is a diagram of an interactive advertising unit to display media content and advertising content.

FIG. 2 is a diagram 200 of an interactive advertising unit 202 to display media content and advertising content.

A user interacts with the system 100 by opening a web browser 212 on the client computing device 102 and entering the address of the web server 106. The client computing device 102 sends a content request associated with the address entered by the user to the server computing device 106. Once the server computing device 106 receives the request, the server computing device 106 retrieves the requested content and transmits the content for display in the web browser 212 on the computing device 102. For example, the user can enter a standard web address, such as http://www.mtv.com/videos/, into the browser window 212 at the client computing device 102. The web server 106 can then transmit the web page located at mtv.com/videos/ to the computing device 102 for display in the browser 212.

In yet other examples, the owner of the server computing device 106 may wish to present an advertisement to the user when the user requests digital media content. As above, the user interacts with the system 100 by entering or navigating to the address of media content associated with the server computing device 106. Upon receiving the request, the server computing device 106 retrieves the requested media content (e.g., from media server 110). Before transmitting the requested media content to the computing device 102, the server computing device retrieves advertising content (e.g., from the ad server 108). In some embodiments, the advertising content is selected by the server computing device 106 based on predetermined criteria, such as a focused advertising campaign. Examples of an advertising campaign can include a predetermined number of displays of the advertising content, a predefined period of time in which the advertising content will be selected for display, a marketing association between the owner of the advertising content, the producer of the requested video content, and the like. The server computing device 106 combines the advertising content and the requested digital media content to provide an interactive advertising unit 202. The server computing device 106 transmits the interactive advertising unit 202 to the client computing device 102 for presentation to a user. The interactive advertising unit 202 presents the advertising content (e.g., from ad server 108) along with the digital media content requested by the user (e.g., from media server 110) in a number of interesting, memorable, and dynamic ways, as shown below.

In some embodiments, the server computing device 106 combines the digital media content and the advertising content into an interactive advertising unit 202 using a multi-layered approach. The server computing device 106 places the digital media content and associated media player into a first content layer 204, and places the advertising content into a second content layer 206. In one embodiment, the second content layer 206 is positioned on top of the first content layer 204 of the interactive advertising unit 202. The interactive advertising unit 202 is transmitted to the client computing device 102 for display, such as in browser window 212 (e.g., embedded in a larger web page). In some embodiments, the interactive advertising unit 202 provides the second content layer 206 using the <div> tag provided by the HTML programming language, in association with Cascading Style Sheets (CSS) to coordinate presentation attributes of the <div> tag.

The interactive advertising unit 202 includes an interaction module 208 which coordinates the interactions between the content layers (e.g., first content layer 204 and second content layer 206). The interaction module 208 manages the spatial presentation, synchronizes the temporal presentation, and controls the presentation priority of the advertising content and the digital media content in the respective content layers 204 and 206. The interaction module 208 coordinates the spatial, temporal, and control functionality to work in concert with each other, advantageously merging the features of each presentation type.

Management of the spatial relationship between the digital media content and the media player in the first content layer 204, and the advertising content in the second content layer 206, is important to providing an engaging and dynamic experience to the user. In one embodiment, the interaction module 208 of the interactive advertising unit 202 positions the second content layer 206 in certain areas above the first content layer 204, thereby enabling the strategic placement of the advertising content in an area that catches the user's attention while keeping the digital media content in the first content layer 204 unobstructed and available for viewing. In another embodiment, the interaction module 208 of the interactive advertising unit 202 positions the second content layer 206 in certain areas above the first content layer 204 in a way that masks or obscures the digital media content in the first content layer 204. In this embodiment, the interaction module 208 leverages the masking of the digital media content to emphasize the advertising content or to reveal the digital media content to the user in a dramatic and unexpected way. In any of these embodiments, the second content layer 206 can be partially or fully transparent until the interactive advertising unit 202 displays the advertising content.

Synchronization of the temporal relationship between the digital media content and the media player in the first content layer 204, and the advertising content in the second content layer 206, is also important to achieving a unique and unexpected user experience. In one embodiment, the interaction module 208 displays advertising content (e.g., a pre-roll video, a pop-up ad) before presentation of the digital media content to assist the user in making a "connection" between the advertised goods and the media content, and thereby increasing the user's anticipation of and engagement in the content.

In addition, control of the presentation priority between the digital media content in the first content layer 204, and the advertising content in the second content layer 206, is important for augmenting the interactive functionality of the interactive advertising unit 202 to increase user interest in and appeal of the presented content. In one embodiment, the interaction module 208 of the interactive advertising unit 202 displays the advertising content until the module 208 receives a user input request to skip the advertising content and begin displaying the requested digital media content in the media player 210, thereby inducing the user to interact with the advertising content and maximizing exposure for the advertised goods. In another embodiment, the interaction module 208 of the interactive advertising unit 202 displays the advertising content until the content has completed its playback then transitions to displaying the requested digital media content in an unexpected way. In this embodiment, the interaction module 208 integrates the display of the advertising content seamlessly into the overall presentation to enable advertising opportunities that are dynamic and interesting.

Although shown as covering almost the entire browser window 212, the content layers 204 and 206 of the interactive advertising unit 202 can vary in size and cover any portion of the browser window 212. In some embodiments, the interactive advertising unit 202 includes multiple content layers, in addition to the first and second content layers 204 and 206. In one embodiment, the interactive advertising unit 202 places one content layer (e.g., second content layer 206) above a media player 210 contained in another content layer (e.g., first content layer 204), while the interactive advertising unit 202 can place another separate content layer (not shown) above a different section of the browser window 212, such as above the top portion or in a side margin. The interaction module 208 of the interactive advertising unit 202 coordinates the spatial presentation management, temporal presentation synchronization, and the presentation priority control of the content residing in each of the provided content layers (e.g., layers 204 and 206). In one embodiment, the interaction module 208 uses a protocol such as LocalConnections provided in the Adobe Flash® development tool to communicate between the respective content layers (e.g., layers 204 and 206).

FIGS. 3A-3D are screenshots of an exemplary embodiment of an interactive advertising unit (e.g., interactive advertising unit 302*c*) provided by the system 100, wherein the advertising unit 302*c* includes a video player pushdown content area integrated with digital media content.

Figure 3A:
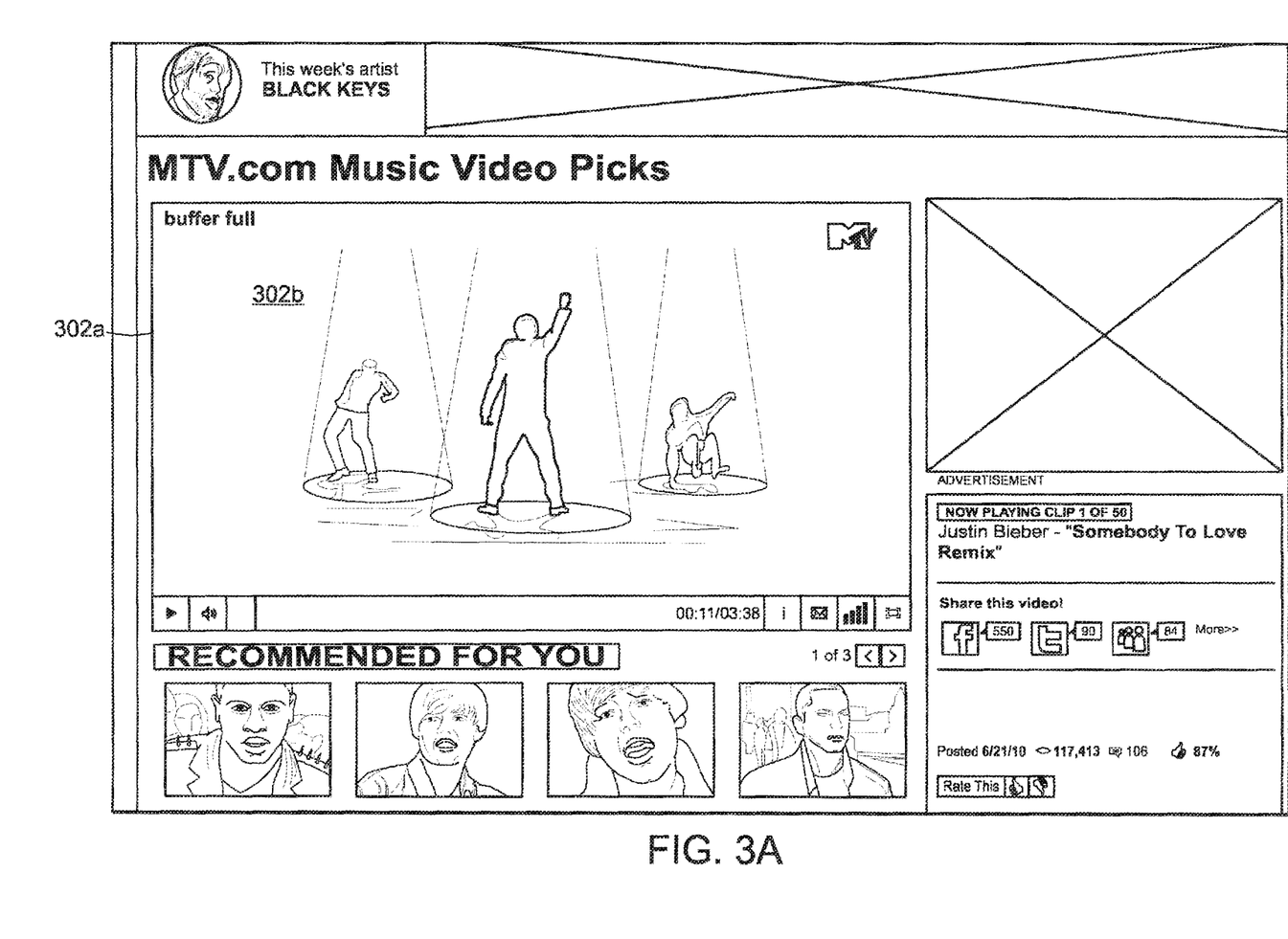
FIGS. 3A-3D are screenshots of an exemplary embodiment of a video player pushdown interactive advertising unit provided by the system and integrated with digital media content.

When a user at a client computing device (e.g., client computing device 102) navigates to a web page that hosts the desired digital media content, the server computing device 106 receives the request and retrieves the requested media content (e.g., from video server 110) and advertising content (e.g., from ad server 108). The server computing device 106 combines the advertising content and the digital media content to provide an interactive advertising unit. The interactive advertising unit places the advertising content—e.g., the video player pushdown content—into the second content layer, and places the digital media content in the first content layer which includes the media player 302*b* (e.g., in a browser window 302*a*). At this point, the interactive advertising unit and video player pushdown content area are hidden from view.

In this embodiment, the second content layer covers the entire area of the media player 302*b* in the first content layer. The interaction module of the interactive advertising unit transfers control to the media player 302*h* in the first content layer, and the media player 302*h* begins playback of the requested media content.

Figure 3B:
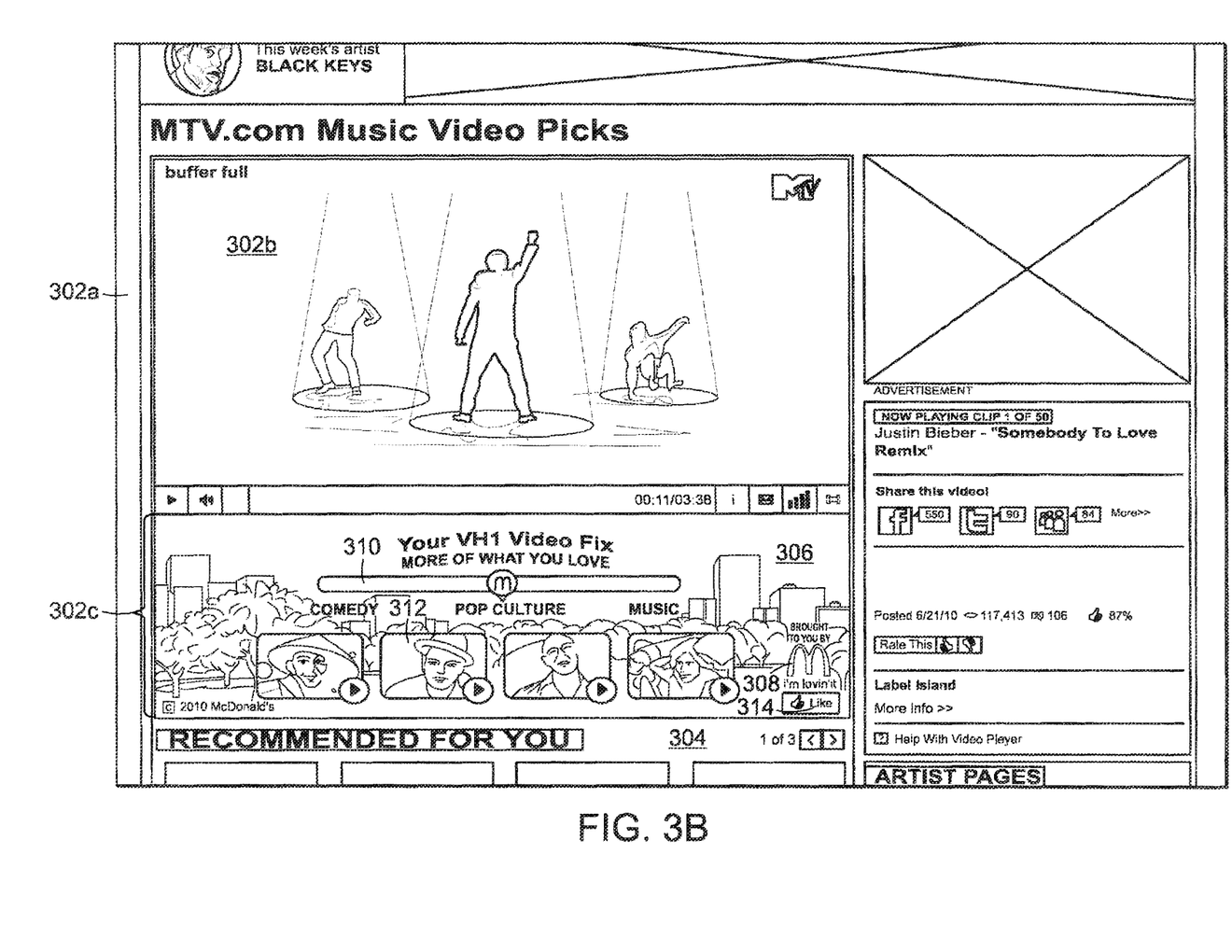

Shortly after the media player 302*b* begins playback of the requested media content (e.g., five seconds), the interaction module of the interactive advertising unit 302*c* (as shown in FIG. 3B) displays the video player pushdown content below the media player 302*b* in a visually stimulating and unexpected manner. Referring to FIG. 3B, the interactive advertising unit 302*c* displays the video player pushdown content by pushing down the web page content (e.g., the "Recommended for You" web page content 304) located immediately below the video player 302*b* to provide space for the newly-revealed video player pushdown content area 306. In some embodiments, the interactive advertising unit 302*c* can display the video player pushdown content area 306 automatically (i.e., without receipt of any user input). In some embodiments, the interactive advertising unit 302*c* can display the pushdown content area 306 after receiving a command or other input (e.g., a mouse click, a mouse-over) from the user.

In some embodiments, the interactive advertising unit 302*c* displays a trigger or similar interactive feature (not shown) within the borders of the playback window of the media player 302*b*. As the media player 302*b* begins playback of the requested media content, the interactive advertising unit 302*c* places the trigger on top of the requested media content (e.g., in a corner of the playback window of the media player 302*b*) so that the trigger is visible to the user. The trigger can be semi-transparent so as to limit obstruction of the requested content. The user interacts with the trigger, and the interactive advertising unit 302*c* responds by revealing the video player pushdown content area 306.

As shown in FIG. 3B, the video player pushdown content area 306 contains advertising and/or branding elements 308 (e.g., a product trademark, service mark, or other icon) and displays additional media content (e.g., music videos) available to the user upon request. The video player pushdown content area 306 also includes interactive elements, such as a control button (in this example, slider bar 310), that the user can manipulate to control display of the additional media content. For example, the user can slide the control button 310 to the left or to the right, and each position in the slider bar 310 can correspond to a different type of media content. The user can slide the control button 310 to the left side in order to indicate a preference for "comedy" media content and, in response to the user manipulation, the interactive advertising unit 302c can present the user with links, screenshots, descriptions or icons (e.g., link 312) connected to one or more videos that are classified or categorized within the comedy genre. Similarly, the user can slide the control button 310 to the right side in order to indicate a preference for "music" media content and, in response, the interactive advertising unit 302c can display links, screenshots, descriptions or icons (e.g., link 312) connected to one or more short-form music videos.

In addition, the interactive advertising unit 302c can display advertisement-branded content in the video player pushdown content area 306. For example, a trademark or similar identifying feature 308 of a commercial product or advertiser (in this case, the "Golden Arches" of McDonald's®) can be included within the video player pushdown content area 306. In some embodiments, the identifying feature 308 is interactive. The interactive advertising unit 302c can receive input corresponding to a user's interaction with the identifying feature 308 (e.g., a mouse click) and display additional information associated with the advertised product or service. For example, the interactive advertising unit 302c can launch a new browser window that brings the user directly to a website featuring the product. In another example, the interactive advertising unit 302c can display an advertisement for the product in proximity to the media player 302b and in the same browser window 302a as the interactive advertising unit 302c (e.g., a banner ad or graphical display).

In some embodiments, the video player pushdown content area 306 can also include interactive features (e.g., "Like" button 314) related to social networking or social media websites. As shown in FIG. 3B, the "Like" button 314 is displayed below the identifying feature 308. When the user clicks on the button 314, the interactive advertising unit 302c transmits information to a social networking site (e.g., Facebook®), which can display the specific media content and/or the trademark and advertiser in the user's profile or other similar page at the social networking site. This technique provides additional exposure for the advertiser and advertised product, and increases the interactivity of the advertising unit 302c, thereby providing benefits for both the advertiser and the user.

Advertisement-branded content is not limited to static icons or trademarks associated with a particular product or advertiser. Advertisement-branded content can include arcade games, puzzle games, trivia games, content rating applications, interactive virtual objects representative of the functionality of the advertised product, chat windows, product catalogs, or other types of interactive entertainment or communication applications.

Figure 3C:
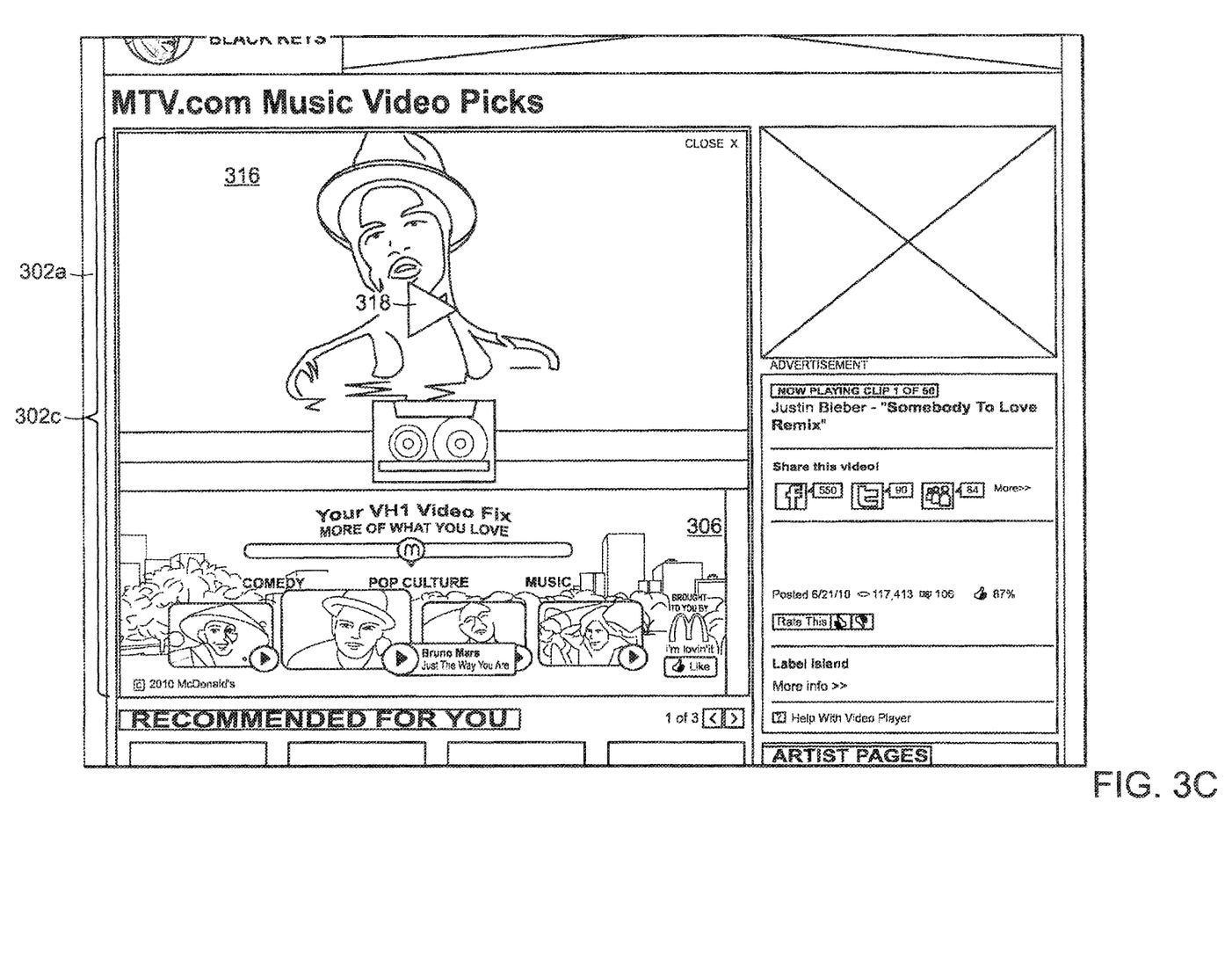

As shown in FIG. 3C, the user interacts with the video player pushdown content area 306 by clicking one of the additional media content links or screenshots (e.g., link 312). In response, the interactive advertising unit 302c launches a fly-up window 316 that covers the playback window of the media player 302b. The interaction module of the interactive advertising unit 302c also sends a command to the media player 302b to pause playback of the initially-requested media content.

In some embodiments, the fly-up window 316 can be displayed using a variety of different animation techniques, including but not limited to moving from another part of the browser window 302a (e.g., popping into place, expanding from the center of the playback window, sliding up into view from the bottom portion of the media player 302b). It should be apparent that these examples are not exhaustive and many available animation techniques can be implemented in order to display the fly-up window 316.

When the fly-up window 316 is active, the interactive advertising unit 302c displays the additional media content corresponding to the link (e.g., link 312) selected by the user in the video player pushdown content area 306. In some embodiments, the interactive advertising unit 302c can automatically begin playback of the additional media content. In some embodiments, the interactive advertising unit 302c pauses playback of the additional media content and display an icon (e.g., play button 318) with which the user must interact before playback of the additional media content will begin.

In some embodiments, the interactive advertising unit 302c displays a 'pre-roll' advertising video before presenting the additional media content to the user. The advertising video can be associated with the advertising or branding elements located in the video player pushdown content area 306. For example, the interactive advertising unit 302c can display a short-form McDonald's® commercial (e.g., twenty-second video) before displaying the additional media content, when the video player pushdown content area 306 includes the "Golden Arches" logo. The interactive advertising unit 302c can display a countdown or other indication that the additional media content requested by the user will begin shortly (e.g., in twenty seconds).

Figure 3D:
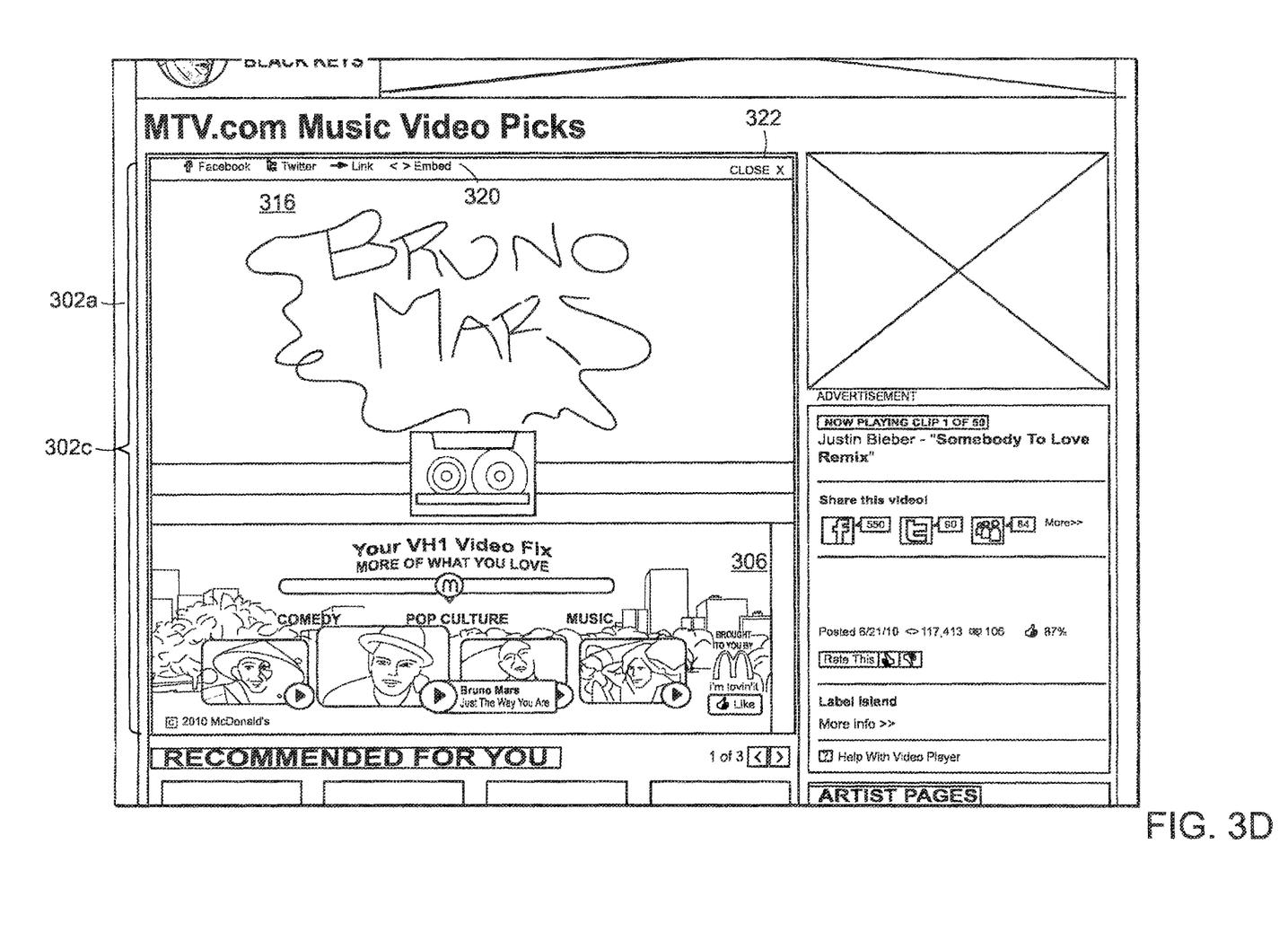

During playback of the additional media content in the fly-up window 316, the video player pushdown content area 306 is still active and available for receiving interaction from the user (e.g., clicking on a different link). In some embodiments, the interactive advertising unit 302c displays additional interactive features associated with sharing or linking the media content playing in the fly-up window 316 to social networking websites. As shown in FIG. 3D, the interactive advertising unit 302c plays the additional media content in the fly-up window 316. The interactive advertising unit 302c also displays a set of sharing tools "Facebook," "Twitter," "Link," "Embed" (collectively, 320) that provide the capability for the user to share the additional media content on various external websites.

The interactive advertising unit 302c also displays a close button 322 in the upper-right corner of the fly-up window 316. The close button 322 enables the user to stop playback of the additional media content and close the fly-up window 316. Upon clicking the close button 322, the interactive advertising unit 302c removes the fly-up window 316, revealing the playback window of the media player 302b that was covered previously. The interaction module of the interactive advertising unit 302c returns control to the media player 302b, and instructs the media player 302b to resume playback of the originally-requested media content.

In some embodiments, the interactive advertising unit 302c can wait until the additional media content has concluded before automatically closing the fly-up window 316. In some embodiments, upon conclusion of the additional media content, the interactive advertising unit 302c can display more media content for consumption by the user. For example, the interactive advertising unit 302c can provide, in the fly-up window 316, links to other media content that may be related in genre, subject matter, theme, or artist to the additional media content. The interactive advertising unit 302c can also display a replay button that enables the user to view the additional media content again.

The above-described systems and methods can be implemented in digital electronic circuitry, in computer hardware, firmware, and/or software. The implementation can be as a computer program product (i.e., a computer program tangibly embodied in a computer readable medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for dynamic integration and presentation of advertising content and media content, the method comprising:
providing, by a server computing device to a remote computing device, an interactive advertising unit comprising:
a first content layer including media content and a media player;
a second content layer including advertising content; and
an integration module configured to operate on the remote computing device to combine at the remote computing device the first and second content layers to display the media content in the media player and display the advertising content under control of the integration module running on the remote computing device, the integration module managing spatial presentation of the media content and the advertising content, synchronizing the temporal presentation and controlling a presentation priority of the media content and the advertising content, wherein the integration module is configured to operate on the remote computing device to manage the spatial presentation by positioning the advertising content over the media player to obscure the media content.

2. The method of claim 1, further comprising receiving, by the server computing device, a request for the media content and, in response to the request, providing by the server computing device to the remote computing device the interactive advertising unit.

3. The method of claim 1, wherein the advertising content includes static advertising content and interactive advertising content.

4. The method of claim 1, wherein the integration module further is configured to operate on the remote computer to: receive a request for additional media content associated with the revealed advertising content; and display the additional media content within the boundaries of the playback window of the media player.

5. The method of claim 1, wherein the integration module acts to reveal the advertising content occurs after a predetermined period of time.

6. The method of claim 1, wherein the integration module is configured to operate on the remote computing device to reveal the advertising content in response to a user request.

7. The method of claim 1, wherein the integration module is configured to operate on the remote computing device to synchronize the revealed advertising content with playback of the media content.

8. The method of claim 1, wherein the integration module is further configured to operate on the remote computing device to conceal the revealed advertising content.

9. The method of claim 8, wherein integration module is configured to conceal the revealed advertising content in response to a user request.

10. The method of claim 8, wherein the integration module is configured to reveal the advertising content without user input.

11. A method for dynamic integration and presentation of advertising content and media content, the method comprising:
providing, by a server computing device to a remote computing device, an interactive advertising unit comprising:
a first content layer including media content and a media player:
a second content layer including advertising content; and
an integration module configured to operate on the remote computing device to combine at the remote computing device the first and second content layers to display the media content in the media player and display the advertising content under control of the integration module running on the remote computing device, the integration module managing spatial presentation of the media content and the advertising content, synchronizing the temporal presentation and controlling a presentation priority of the media content and the advertising content, wherein the integration module is configured to operate on the remote computing device to manage the spatial presentation by positioning the advertising content in proximity to the media player to display the requested media content unobscured.

12. The method of claim 1, wherein the integration module is configured to operate on the remote computing device to reveal the advertising content by displaying an animation.

13. The method of claim 1, wherein the integration module is configured to operate on the remote computing device to extend a display area of the media content to a widescreen format.

14. The method of claim 3, wherein the static content and the interactive content are related according to one of genre, theme, advertised product and subject matter.

15. The method of claim 3, wherein the interactive content includes one of arcade games, puzzle games, trivia games, content rating applications, interactive virtual objects representative of a functionality of an advertised product, chat windows and product catalogs.

16. The method of claim 1, wherein the integration module is further configured operate on the remote computing device to receive input based on a user action.

17. The method of claim 3, wherein at least one of the static content and the interactive content includes a graphical representation of one of an advertised product and an advertised service.

18. The method of claim 1, wherein the integration module is configured to operate on the remote computing device to transmit commands from the second content layer to the first content layer, the commands being operable to control playback of the media content in the media player.

19. A system for dynamic integration and presentation of advertising content and media content, the system comprising:
a server computing device configured to generate an interactive advertising unit comprising:
a first content layer including media content and a media player;
a second content layer including advertising content; and
an integration module configured to operate on the remote computing device to combine, at the remote computing device the media content and the advertising content, the integration module operating on the remote computing device to display the media content in the media player and reveal the advertising content and manage a spatial presentation of the media content and the advertising content, synchronize a temporal presentation and control a presentation priority of the media content and the advertising content, wherein the integration module is configured to operate on the remote computing device to manage the spatial presentation by positioning the advertising content over the media player to obscure the media content; and transmit the interactive advertising unit to the remote computing device.

20. A non-transitory computer program product, tangibly embodied in a computer readable storage medium, for dynamic integration and presentation of advertising content and media content, the computer program product including instructions operable to configure a data processing apparatus to:

generate an interactive advertising unit comprising:

a first content layer including media content and a media player;

a second content layer including the advertising content; and an integration module configured to operate on a remote computing device to combine at the remote computing device the media content and the advertising content and display the media content in the media player, the integration module being further configured to manage a spatial presentation of the media content and the advertising content, synchronize a temporal presentation and control a presentation priority of the media content and the advertising content, wherein the integration module is configured to operate on the remote computing device to manage the spatial presentation by positioning the advertising content in proximity to the media player to display the requested media content unobscured; and transmit the interactive advertising unit to the remote computing device.

* * * * *